(12) United States Patent
Suranyi

(10) Patent No.: US 6,885,937 B1
(45) Date of Patent: Apr. 26, 2005

(54) SHORTCUT GENERATOR

(75) Inventor: Edward Joseph Suranyi, Union City, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 0 days.

(21) Appl. No.: 09/208,709

(22) Filed: Dec. 10, 1998

(51) Int. Cl.⁷ .......................................... G06F 165/00
(52) U.S. Cl. ................... 701/208; 701/26; 701/209; 701/210; 340/990
(58) Field of Search .................... 701/26, 28, 202, 701/208, 209, 210, 35, 200; 340/988, 990, 995; 73/178 R

(56) References Cited

U.S. PATENT DOCUMENTS

| | | | |
|---|---|---|---|
| 5,098,683 A | 3/1992 | Mehrotra et al. | 423/266 |
| 5,486,822 A | 1/1996 | Tenmoku et al. | 340/995 |
| 5,774,362 A | 6/1998 | Suzuki et al. | 364/443 |
| 5,845,228 A | 12/1998 | Uekawa et al. | 701/209 |
| 5,893,081 A | 4/1999 | Poppen | 705/400 |
| 5,916,299 A * | 6/1999 | Poppen | 701/202 |
| 6,016,485 A * | 6/1999 | Amakawa et al. | 705/400 |
| 5,938,726 A | 8/1999 | Reber et al. | 709/217 |
| 5,978,730 A * | 11/1999 | Poppen et al. | 701/202 |
| 5,995,105 A | 11/1999 | Reber et al. | 345/356 |
| 6,038,509 A * | 3/2000 | Poppen et al. | 701/210 |

FOREIGN PATENT DOCUMENTS

| | | | | |
|---|---|---|---|---|
| EP | 0 679 867 A1 | 11/1995 | | G01C/21/20 |
| EP | 0 854 353 A2 | 7/1998 | | G01C/21/20 |

* cited by examiner

Primary Examiner—Gertrude A. Jeanglaude
(74) Attorney, Agent, or Firm—Fliesler Meyer LLP

(57) ABSTRACT

An electronic map is stored as a collection of nodes and links. Roads in the map are assigned priorities for pathfinding purposes. A node's priority originally corresponds to the priority of the road associated with the node. Electronic maps can be made more useful by adding short cuts to the map. A short cut generator is disclosed that creates short cuts by building compound links and/or raising the priority of certain nodes. A compound link is a link that represents travel along multiple links of the electronic map.

30 Claims, 10 Drawing Sheets

Fig. 1
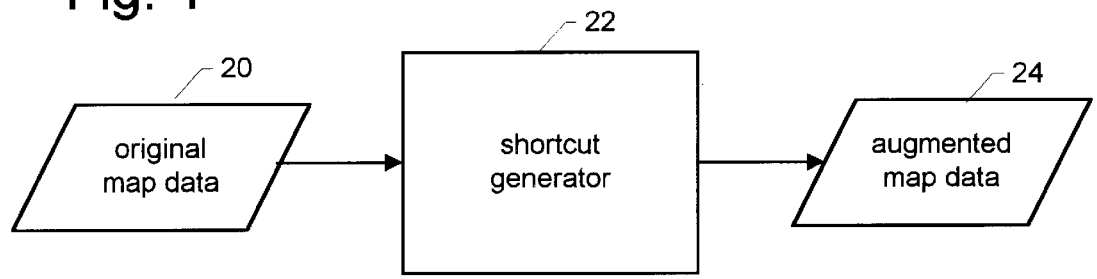
Fig. 2
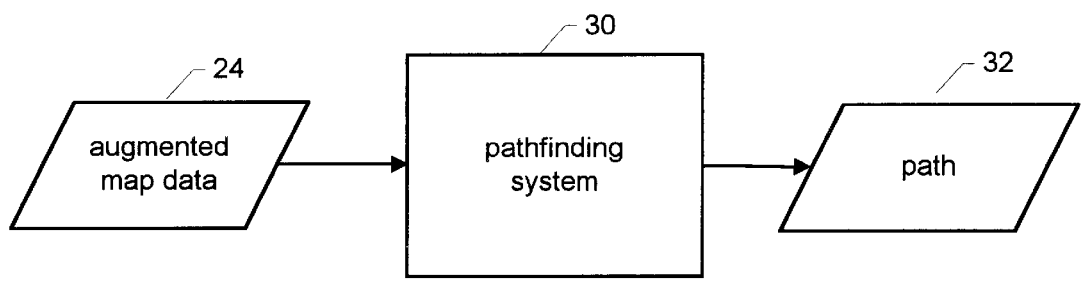
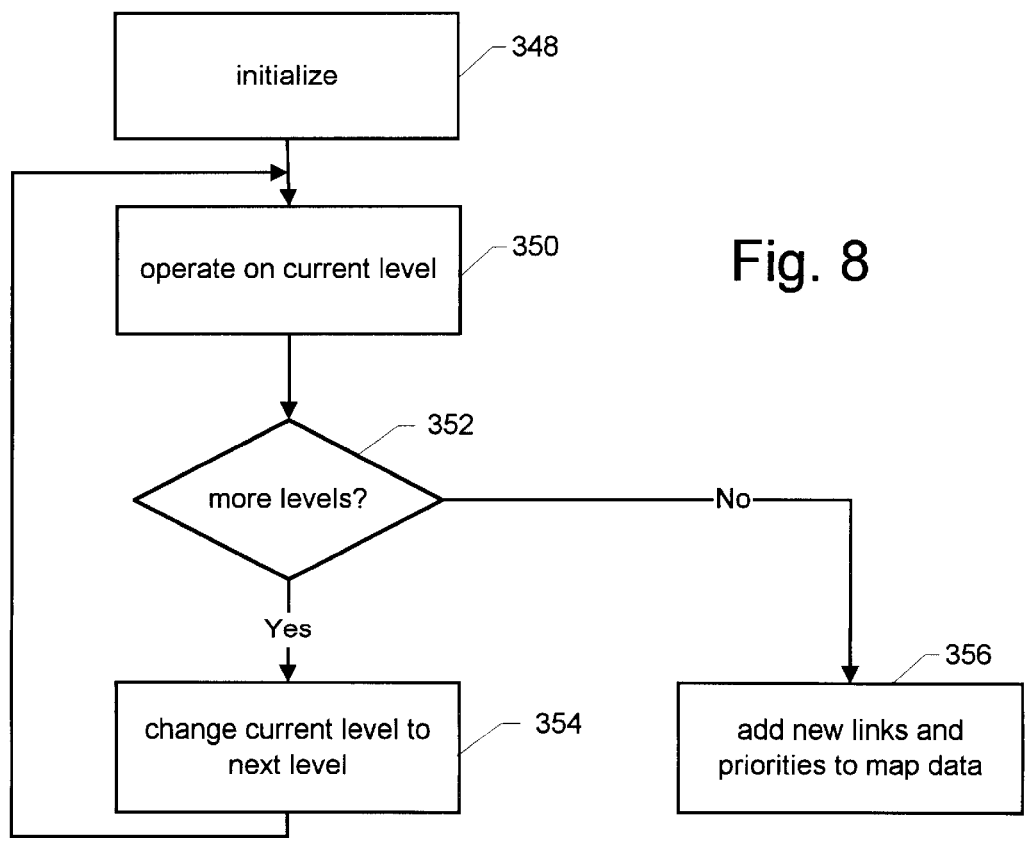
Fig. 8

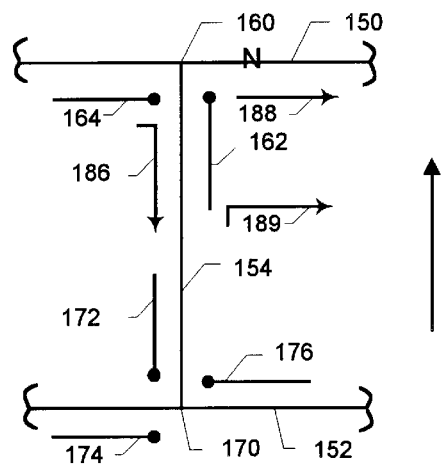
FIG. 3
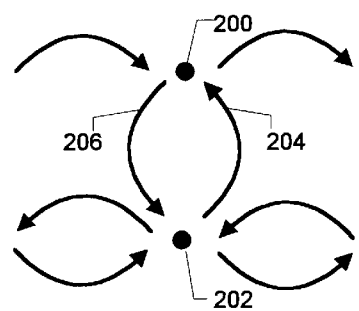
FIG. 4
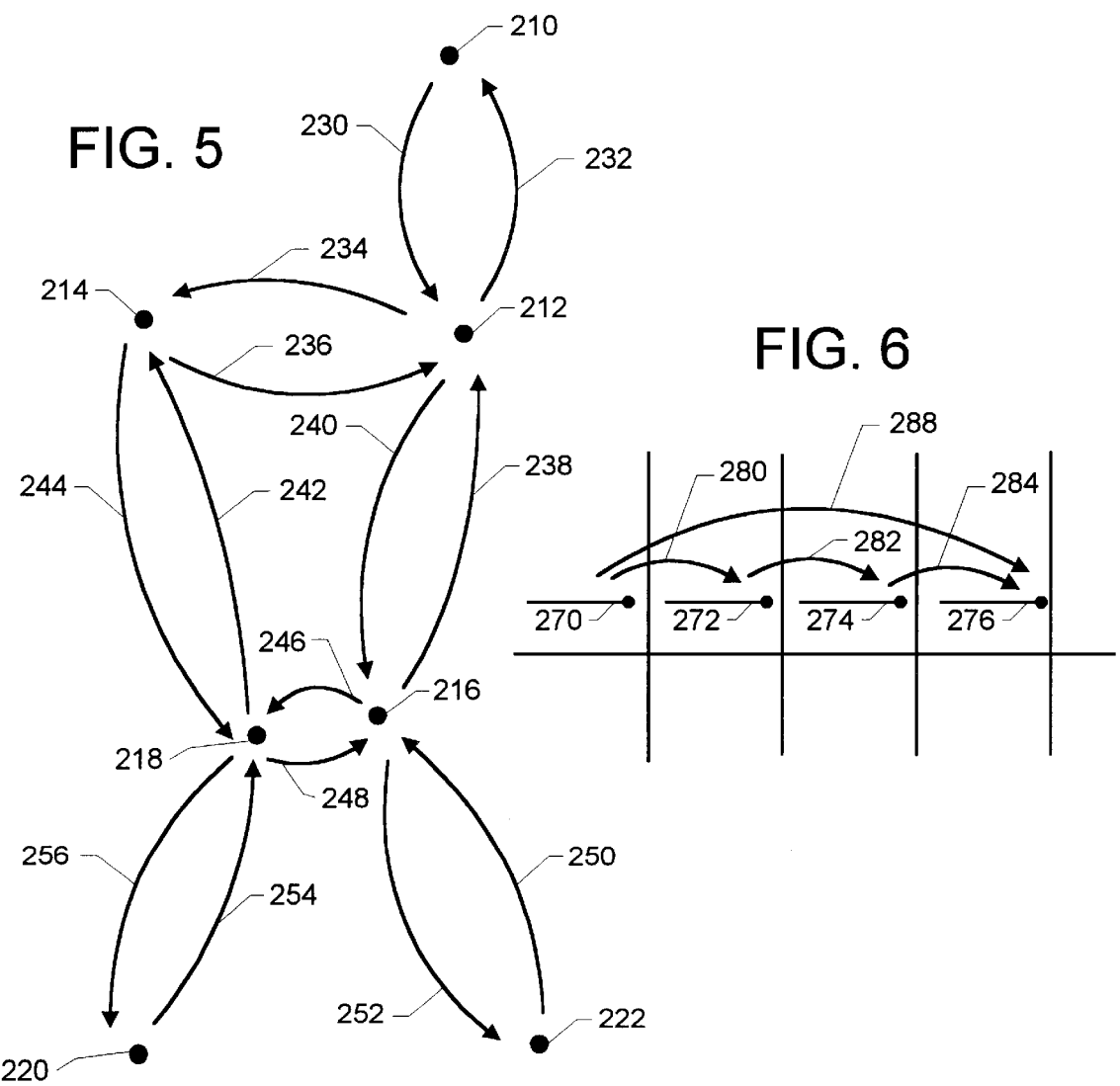
FIG. 5
FIG. 6

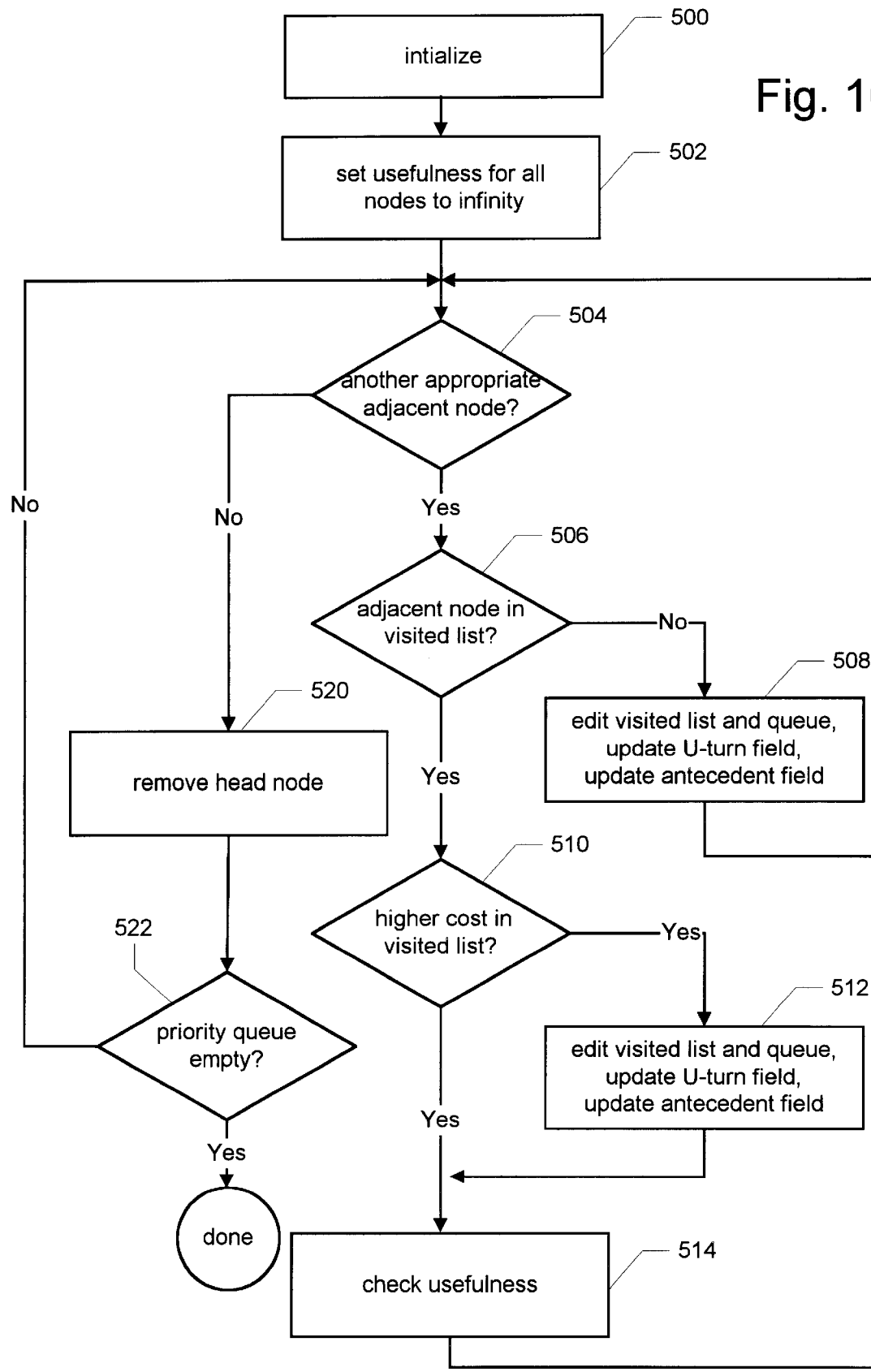

SHORTCUT GENERATOR

BACKGROUND OF THE INVENTION

1. Field of the Invention

The present invention is directed to a system for generating and adding shortcuts to an electronic map.

2. Description of the Related Art

The computer has revolutionized the idea of a map from an image statically depicting locations to the electronic map, which consists of geographically referenced electronic data quantifying a physical, social or economic system. The range of information included in electronic maps is unlimited. For example, an electronic map of roads could include distances between elements, travel time, lot numbers, tax information, tourist information, processing time, waiting time, etc. Additionally, storing a map as one or more intelligent data files on a computer allows for unlimited software applications to manipulate that data.

One advantage of the electronic map is that it can store, determine and use costs associated with various portions of the map. A cost is a variable that can be minimized or maximized. Examples of costs include time, distance, tolls paid, ease of turning, quality of scenery, etc. Typically, costs are represented as integers. Sometimes costs can be represented as real numbers or non-standard numbers. Additional information about costs and non-standard numbers can be found in U.S. Pat. No. 5,890,081, dated Apr. 6, 1999, "Using Multiple Levels Of Costs For A Pathfinding Computation," incorporated herein by reference.

Electronic maps can be used for pathfinding, which is a method for computing a route between an origin and a destination. Some systems compute recommended routes and guide the driver by highlighting the recommended route on a map display, or by giving turn-by-turn directions (via paper, display or audio), or both. When a pathfinding system is computing a recommended route to a destination, it does so by finding the most desirable route according to certain specified criteria. These criteria may be specified by the driver, or may be set as defaults at the time of manufacture. Often, a system will be used to find a path that minimizes (or maximizes) some cost, for example, driving time.

An electronic map that is used for pathfinding must carry information about the connectivity of a road network, that is, information about the ways in which pieces of road do or do not connect to each other, for example, where there are ordinary intersections, where there are overpasses, where turns are restricted, and so on. For an area of any significant extent, this is a very large amount of information. An electronic map includes tens or hundreds of megabytes of data. In order to hold such vast quantities of data economically and allow a user to replace maps with updated copies easily, many current pathfinding apparatus (which includes general purpose computers with pathfinding software, automotive navigation systems or other map application equipment) use CD-ROMs to store the electronic map data.

Because a pathfinding process must sort through a large volume of data, the process can be slow. One means to speed up the pathfinding process is to use priority levels. The use of priority levels also enables the pathfinding process to find a path in a manner similar to the way humans perform the pathfinding process so that the final path would be similar to a path determined by a human. Having the path similar to a human determined path makes the path more understandable and user friendly.

When manually finding a path on a paper map, a user typically identifies the origin and destination. The user will navigate through residential roads to traverse to a major road such as a collector or arterial road. The user will then navigate through major roads to find a highway. The path will continue to be determined on highways until the closest highway exit to the destination is found. At that point, the user will then navigate through major roads to get as close as possible to the destination. Finally, the user will find a path from the closest point on a major road to the destination using residential roads. Thus, the user is inherently using priority levels. That is, one priority level could be the residential roads, a second priority could be the major roads and a third priority could be the highways. At one point during the pathfinding process the user is navigating through residential roads. At a second point the user is only navigating through major roads and/or highways. At a third point the user is only navigating through highways, and so on. This process is more efficient because if the user looked through all roads at all times, there would be too much data to consider and the path is not likely to be the most efficient path.

In order to efficiently find a useful path, a pathfinding system will also use priority levels. Various pathfinding systems divide the different types of roads into different levels. Whether the system uses three levels, four levels, five levels, six levels, etc., it is not necessarily important to the present discussion. Table 1 provides an example of a system that divides the roads into six priority levels.

TABLE 1

| Type of Road | Priority |
| --- | --- |
| alley | 0 |
| residential | 1 |
| collector | 2 |
| arterial | 3 |
| less important highway | 4 |
| important highway | 5 |

As can be seen, Table 1 divides the different roads into six types of roads: alleys, residential roads, collector roads, arterial roads, less important highways and more important highways. Each type of road is assigned a priority. In one pathfinding system, when the system is determining a path from an origin to a destination, the system will begin by performing a pathfinding exploration from the origin and destination simultaneously, considering priority one and above roads. This pathfinding exploration will continue until promotion criteria have been met. The promotion criteria include three sets of criteria. The first criteria is a promotion threshold. The promotion threshold is a cost. When the cost of traveling from the origin to a node under consideration (or from the node to the destination) is greater than the promotion threshold, then the promotion threshold has been met. The second criteria is that a minimum number of nodes at the lower priority (or higher) must have been reached in the exploration. The third criteria is that a minimum number of nodes at the higher priority (or higher) must have been reached in the exploration. For example, when promoting from priority level one to level two, priority level one is the lower priority and priority level two is the higher priority. The promotion criteria have been met when all three criteria are satisfied.

An example of a set of promotion thresholds are depicted below in Table 2. For example, the first row lists the cost in milliseconds representing the promotion threshold for promoting the exploration from level zero (and above) to level one (and above).

TABLE 2

| Priority Levels for Promotion | Promotion Threshold (cost in milliseconds) |
| --- | --- |
| 0 | 0 |
| 0 to 1 | 10,000 |
| 1 to 2 | 10,000 |
| 2 to 3 | 120,000 |
| 3 to 4 | 300,000 |
| 4 to 5 | 600,000 |

An example set of values for the second and third promotion criteria are set forth in Table 3.

TABLE 3

| Level for Promotion | Minimum number of nodes at lower priority (or higher) | Minimum at higher priority (or higher) |
| --- | --- | --- |
| 0 to 1 | 20 | 1 |
| 1 to 2 | 20 | 20 |
| 2 to 3 | 30 | 30 |
| 3 to 4 | 40 | 40 |
| 4 to 5 | 50 | 25 |

After meeting the promotion criteria for exploring at priority level one and above, the system will continue the pathfinding process by only considering roads that are priority two and above until fulfilling second promotion criteria. After reaching the second promotion criteria, the system will continue to explore the electronic map, but only consider roads at priority level three and above until reaching third promotion criteria. After meeting the third promotion criteria, the system will continue to explore through the electronic map while only considering nodes at priority level four and above until reaching fourth promotion criteria. After fulfilling the fourth promotion criteria, the system will continue exploring the electronic map while only considering roads at priority level five.

One enhancement made to some prior art pathfinding systems that use priority levels as discussed above is to include short cuts, which speed up the pathfinding process, help create better paths and help create paths that are more like a path that would be created by a human using a paper map. Some prior art systems that make use of short cuts in electronic maps have humans manually adding short cuts to the electronic map database. This process is slow, tedious and inefficient.

Other prior art systems make use of computers to automatically generate short cuts. However, these systems have suffered because the short cuts generated by the computers have tended to include paths that are not useful to the consumer. That is, although a proper short cut meeting the requirements of the particular method is generated, there exists a better short cut or path that is more useful than the short cut generated. Many users access a pathfinding system because they want the system to determine the shortest path possible in a very small amount of time. Users are disappointed with performance of a system when a user is in a neighborhood that they are familiar with and the system determines a short cut that is longer than a short cut known by the user of the pathfinding system.

Therefore, a system is needed that can automatically add short cuts to an electronic map database such that the short cuts that are added are useful and efficient short cuts.

SUMMARY OF THE INVENTION

The present invention, roughly described, provides for a system that can generate short cuts for an electronic map database. The short cut generator disclosed can create short cuts by building compound links and/or raising the priority of certain nodes in a map database. A compound link is a link that represents travel along multiple links.

In one embodiment, the present invention is implemented using a method which includes storing a set of nodes and links of the electronic map. The links each have link priorities. The system explores outward from the nodes using a processor. The step of exploring includes determining which nodes are not useful. New link priorities are created for a set of links that were traversed during the step of exploring and that do not terminate at a node determined to be not useful. Compound links are built. The compound links may include one or more links with the new link priorities. The system stores the compound links in the electronic map. These compound links represent the short cuts.

In one embodiment, the invention also includes storing node priorities for the nodes in the electronic map. New node priorities are created for a set of the nodes connected by one or more of the links having the new link priorities. The new node priorities are stored in the electronic map.

In one alternative, the system also includes the step of storing one or more U-turn indications for paths traversed during the step of exploring that include a U-turn. In this implementation, the step of creating new link priorities does not consider links or paths associated with the stored U-turn indications.

When storing the compound links and new node priorities, the new data can be stored in the existing electronic map files. Alternatively, new files can be generated that include the new node priorities and compound links as well as the appropriate original data from the original map files.

The present invention can be implemented using software, hardware, or a combination of software and hardware. When all or portions of the present invention are implemented in software, that software can reside on a processor readable storage medium. Examples of appropriate processor readable storage medium include a floppy disk, hard disk, CD ROM, memory IC, etc. When the system includes hardware, the hardware may include an output device (e.g. a monitor, speaker or printer), an input device (e.g. a keyboard, pointing device and/or a microphone), a processor in communication with the output device and processor readable storage medium in communication with the processor. The processor readable storage medium stores code capable of programming the processor to perform the steps to implement the present invention. The process of the present invention can also be implemented on a web page on the Internet or on a server that can be accessed over the telephone lines.

Many of the steps of operation described below are found in prior art short cut generators. However, the prior art short cut generators do not include a means for utilizing the usefulness of a node or for efficiently using U-turns as described below.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 1 is a block diagram showing how the short cut generator of the present invention is used.

FIG. 2 is a block diagram showing how the output of the short cut generator can be used.

FIG. 3 is an example of a portion of a directed graph representing part of an electronic map.

FIG. 4 is a second example of a portion of a directed graph representing part of an electronic map.

FIG. 5 is a third example of a portion of a directed graph representing part of an electronic map.

FIG. 6 is a fourth example of a portion of a directed graph representing part of an electronic map.

FIG. 8 is a flow chart describing the operation of the short cut generator.

FIG. 10 is a flow chart describing the method for performing step 406 (explore from node picked) of FIG. 9A.

DETAILED DESCRIPTION

Figure 7:
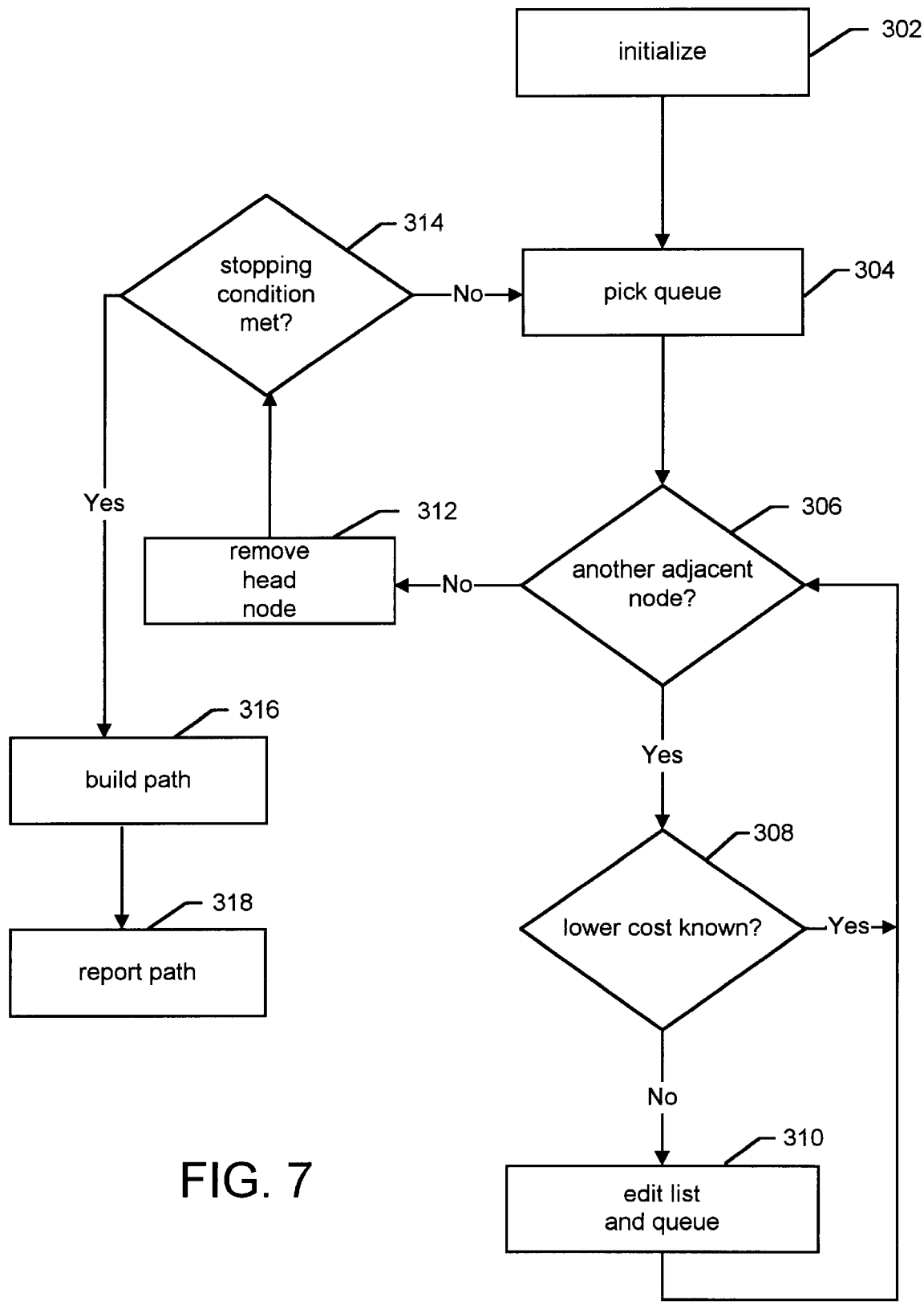
FIG. 7 is a flow chart describing an exemplar method for finding a path in an electronic map or other graph.

FIG. 1 is a block diagram showing how the short cut generator of the present invention is used. FIG. 1 shows short cut generator 22 receiving an input and providing an output. The input includes original map data 20 and the output includes augmented map data 24. Original map data 20 is a collection of one or more files making up a map database. More details of a map database are explained below. The original map database 20 can be received by the short cut generator 22 via modem, email, file transfer, pointers, function calls, etc. Original map data 20 is stored on a processor readable storage medium. Short cut generator 22 receives original map data map 20 and adds short cuts, as described below, to create augmented map data 24. The creation of augmented map data 24 can include adding the new map data (i.e. the short cuts) to the existing original map data files 20. Alternatively, the creation of augmented map data 24 can include creating new files which include the new data created by short cut generator 22 and some or all of the old data from original map data 20. The resulting augmented map data 24 is an electronic map stored in one or more files that include short cuts created by short cut generator 22.

As depicted in FIG. 2, the augmented map data 24 can be used as an input to a pathfinding system 30. During operation, the pathfinding system 30 would store the augmented map data 24 on a processor readable storage medium. A user of pathfinding system 30 would designate an origin and a destination, both of which would be stored by the pathfinding system 30 on a processor readable storage medium. Pathfinding system 30 can find a path from the designated origin to the designated destination using augmented map data 24. The output of pathfinding system 30 is path 32. Path 32 is stored on a processor readable storage medium and reported to the user of the pathfinding system.

Before explaining how short cut generator 22 creates augmented map data 24, a basic explanation of an electronic map will be provided. Generally, an electronic map used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links. A weighted graph is a graph in which each link (or edge) has a cost associated with it. Alternatives include associating the costs with the nodes, with the nodes and links, or with another element of the graph. An undirected graph is a graph where each link is bidirectional. An undirected graph can be thought of as a directed graph where each link represents two links with the same end points but different directions.

FIG. 3 shows an exemplar directed graph which shows eastbound one-way street 150 and two-way street 152, both intersecting with two-way street 154. Street 150 intersects with street 154 at intersection 160. Street 152 intersects with street 154 at intersection 170. At intersection 160 are two nodes, 162 and 164. The head of the node is a solid circle. The rear of the node is a straight-line tail. The circle represents where the node is located and the tail represents where a traveler would come from to reach that node. The node symbol is displaced from the actual intersection for purposes of visibility. For example, node 162 represents travel northbound on street 154 toward intersection 160. Node 164 represents travel eastbound on road 150 toward intersection 160. There is no node at intersection 160 to represent westbound travel on street 150 because street 150 is an eastbound one-way street. Thus, a traveler proceeding north on road 154 and reaching intersection 160 can only make a right turn. Node 172 represents arriving at intersection 170 by traveling south on street 154. Node 174 represents arriving at intersection 170 by traveling east on road 152. Node 176 represents arriving at intersection 170 by traveling west on road 152.

Links represent a path between nodes. For example, from node 164 a traveler can make a right turn at intersection 160 to proceed on road 154 or can proceed straight on road 150. Link 186 represents travel starting from intersection 160 on road 150 facing east, making a right turn at intersection 160 and proceeding south on road 154. Thus, link 186 connects node 164 to node 172. Link 188 connects node 164 to the next node on street 150 (not shown) and represents travel east along road 150, proceeding straight through intersection 160 without turning. Link 189 represents travel starting from intersection 160 on road 154 facing north, making a right turn at intersection 160 and proceeding east on road 150; therefore, link 189 connects node 162 to the next node on street 150 (not shown). FIG. 3 only shows links for nodes 162 and 164. If links are drawn for all nodes, the directed graph would become too crowded and would be difficult to read. Thus, the directed graph can be simplified and redrawn as in FIG. 4.

In FIG. 4, all the nodes at the same intersection are collapsed into one node. Thus, node 200 represents nodes 164 and 162. Node 202 represents nodes 172, 174 and 176.

Note that the tails of the nodes are not drawn. The links are used to indicate directions of allowable travel. Link 204 indicates travel from intersection 170 to intersection 160 and link 206 indicates travel from intersection 160 to intersection 170. In actual use, the present invention can make use of a graph similar to FIG. 3 or FIG. 4.

The graph of FIGS. 3 & 4 are used to symbolically understand the electronic map data structure stored in a processor readable storage medium. That is, a processor readable storage medium does not actually store an image of a directed graph. Rather, a data structure is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, other networks, or any other suitable subset of information. Furthermore, one or more entries in a data structure can be grouped together in a cluster of data. A cluster of data is a grouping of related data. Although clusters improve performance, the present invention can be used without clusters. More information about clusters can be found in U.S. Pat. No. 5,706,503, "Method of Clustering Multi-Dimensional Related Data In A Computer Database By Combining The Two Vertices of a Graph Connected by An Edge Having the Highest Score," incorporated herein by reference.

Looking back at FIG. 1, short cut generator 22 operates on original map data 20 to create augmented map data 24. In general, short cut generator 22 performs two overall functions. First, short cut generator will build new links to add to original map data 20. Second, short cut generator will create new priorities for existing nodes in original map data 20. The new links and new priorities are stored in augmented map data 24. Note that short cut generator 22 generally does not change any costs for traveling in an electronic map.

There are two kinds of links created by short cut generator 22. The first type of link created is a path over roads at a lower priority level that is useful to travel on between two higher priority level roads. The second type of link created is a high priority level link that skips over a number of lower priority links. Both types of links created will be discussed with respect to FIGS. 5 and 6.

FIG. 5 shows an example of a graph that is a portion of an electronic map. FIG. 5 shows nodes 210, 212, 214, 216, 218, 220 and 222. Connecting those nodes are links 230, 232, 234, 236, 238, 240, 242, 244, 246, 248, 250, 252, 254 and 256. For exemplar purposes, assume that links 242, 244, 254 and 256 are along a first highway at priority level five. Assume that links 234 and 236 are along a second highway at priority level five. Additionally, assume that links 230, 232, 238, 240, 250 and 252 are along a third highway which is also at priority level five. Finally, assume that links 246 and 248 represent travel along an arterial road which is at priority level three. Assume for exemplar purposes that a user wants to travel from node 220 to node 210. One prior art navigation system may determine the path from node 220 to node 210 that only travels along highways. Such a path would include travel along links 254, 242, 236 and 232. The present invention short cut generator would create a short cut such that the user would travel along links 254, 248, 238 and 232. To accomplish this, short cut generator 22 would generate short cut link 248. Typically, short cut 248 is a compound link that represents travel on two or more links along the arterial road. These two or more links at priority level three are replaced by short cut link 248 at priority level five. Thus, short cut link 248 is one example of a link created by short cut generator 22 that represents a path over roads at a lower level that is useful to travel on between two higher level roads. That is, a driver of a car would reach destination 210 quicker by traveling on links 254, 248, 238 & 232 rather than traveling on links 254, 242, 236 and 232.

FIG. 6 shows another example of a short cut link. FIG. 6 shows four nodes 270, 272, 274 and 276. Link 280 connects node 270 to node 272. Link 282 connects node 272 to node 274. Link 284 connects node 274 to node 276. For this example, assume that links 280, 282 and 284 all have target nodes at the same priority level. A link's target node is the node at which the link terminates. For example, the target node for link 284 is node 276.

Short cut generator 22 may create a new compound link 288 which connects node 270 to node 276. The priority level of the target node associated with link 288 will be higher than the priority levels of the target nodes for links 280 and 282. Additionally, the priority level of nodes 270 and 276 will be higher than the priority levels of nodes 272 and 274. Link 288 is a second example of a short cut link created by short cut generator 22.

Before explaining the details of how short cut generator 22 creates new links and new priorities, it is useful to understand how an exemplar pathfinding system 30 will determine a path from an origin to a destination.

FIG. 7 is a flow chart which explains a method of determining a path from an origin to a destination. The method of FIG. 7 is only one of many methods of pathfinding known in the art. Other methods of pathfinding can also be used with the present invention. In step 302, the system initializes the pathfinding exploration. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the known lowest cost from the origin to the node plus an estimated cost of traveling from the node to the destination. There are various alternatives for estimating the cost for traveling from the node to the destination which are suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the known lowest cost path from the node to the destination. An alternative key includes using the sum of the known lowest cost from the node to the destination plus an estimated cost from the origin to the node. The key described above for the origin priority queue which utilizes the estimated remaining costs produces an exploration from the origin that is biased in the direction of the destination. Similarly, an exploration from the destination is biased in the direction of the origin.

Other methods of computing a key are also within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialization step 302 is completed, the origin priority queue and the origin visited list include the origin, and the destination priority queue and the destination visited list include the destination.

Once the system is initialized, the system chooses a queue according to a rule in step 304. There are many rules of picking a queue which are suitable for the present invention. In one system, the queue containing the element with the smallest key is chosen, with ties broken arbitrarily. In another system, the queue containing the least amount of elements is chosen. Other examples of rules for choosing a queue include alternating between queues; or choosing the origin queue for a certain number of iterations (or a time period), switching to the destination queue for a certain number of iterations, switching back to the origin queue for a certain number of iterations, etc. Since the queues are sorted by keys, the node with the smallest key will be at the head of the queue (also called the front or the top of the queue). This node is called the "head node."

In step 306, the system looks for all nodes which are adjacent nodes to the head node of the chosen queue and picks one of those nodes. Since the system has just started, the only node in the origin priority queue is the origin. The adjacent nodes are those nodes which can be traveled to/from (whichever is appropriate) the head node without going through any other nodes. In step 308, the system determines whether there is a lower cost known on the visited list or the priority queue for the adjacent node picked. That is, the system determines the cost of traveling between the adjacent node and the head node and adds that cost to the cost already known for the head node. If there is no lower cost known then, in step 310 the system edits the visited list and the priority queue to add the adjacent node and its cost. If there is a lower cost known, then the visited list is not edited and the system loops back to step 306. After step 310, the method loops back to step 306 to determine whether any additional adjacent nodes have not been considered. If all of the adjacent nodes have been considered, then the method proceeds to step 312 and the head node is removed from the priority queue.

In step 314, the system determines whether a stopping condition has occurred. There are many stopping conditions which are suitable for the present invention. One example of a suitable stopping condition is stopping when a node has been the head node on both the origin priority queue and the destination priority queue. Another stopping condition includes stopping when the cost of traveling from the origin to the head node in the origin priority queue plus the cost of traveling from the head node of the destination priority queue to the destination is greater than or equal to the total cost of the best connection node. A connection node is the node that appears on the destination visited list and the origin visited list. Total cost of a connection node is the cost from the origin to the connection node plus the cost from the connection node to the destination. The best connection node is the connection node with the lowest total cost. If the stopping condition has not been met, the system proceeds to step 304 and picks the other queue. If the stopping condition is met, the system builds the path in step 316. In step 318, the system reports the path. Reporting the path can include displaying a map showing the path, displaying a map with the path highlighted on the map, providing turn-by-turn directions, providing an audio output describing the path, creating and passing a file with data describing the path, passing a pointer to data describing the path, passing data describing the path in response to a function call, etc.

The step of building the path (step 316) is as follows. A rule selects some connection node. One such rule is to choose the best connection node. The selected connection node K is looked up in the origin visited list and the previous node $P_1$ on the path from the origin is found. If $P_1$ is not the origin, then $P_1$ is looked up in the visited list and the previous node $P_2$ is found. This continues until the origin is reached. Suppose the origin is reached as node $P_L$. Similarly, K is looked up in the destination visited list and the next node $N_1$ is found. If $N_1$ is not the destination, then $N_1$ is looked up in the visited list. This continues until the destination is reached. Suppose the destination is reached as node $N_M$. At this point the path from the origin to the destination is known: it is the path from $P_L$ (the origin) to $P_{L-1}$, to $P_{L-2}, \ldots,$ to $P_2$, to $P_1$, to K, to $N_1, \ldots,$ to $N_{M-1}$, to $N_M$ (the destination). Additional information about pathfinding can be found in Caching For Pathfinding Computation, by Richard Frederick Poppen, Rodney Jude Fernandez and James Laurence Buxton, U.S. Pat. No. 5,978,730 dated Nov. 2, 1999 and A System For Pathfinding, by Koji Amakawa and Edward Joseph Suranyi, U.S. Pat. No. 6,016,485 dated Jan. 18, 2000 both incorporated herein by reference.

As described above, the process of FIG. 7 is likely to be performed on different priority levels. For example, the roads can be broken up into the different priority levels as indicated in Table 1 and the pathfinding process can use the promotion thresholds described above with respect to Table 2.

FIG. 8 is a flow chart explaining the operation of short cut generator 22. The first step in FIG. 8 is to initialize 348. The step of initialization includes reading and storing original map data 20. The stored map data includes nodes, links and, in some embodiments, priorities for nodes and/or links. In step 350, short cut generator 22 operates on the current scan level. As described above, the network of roads are broken up into different priority levels. To accommodate the different priority level of roads, the operation of short cut generator 22 is divided into a number of scan levels. Each scan level corresponds to a priority level of the roads. Because each scan level is associated with a priority level, the associated priority level is labeled as the scan priority. The current scan level means the scan level currently being operated on. Thus, the first time step 350 is performed, the current scan level is level one and the current scan level priority is priority one. After operating at the current scan level, short cut generator 22 determines whether there are any more levels to operate on (step 352). If there are more levels to operate on, then the current scan level and the current scan level priority are changed to the next level in step 354. Thus, in step 350, if the current scan level operated on was level one, then the current scan level is changed to level two and the system loops back to step 350 and operates on level two. After operating on level two, the system will continue to loop through step 350–354 and operate on level three, level four and level five. After operating on level five (assuming that there are five levels), the system will determine in step 352 that there are no more levels to operate on and short cut generator 22 will proceed to step 356 which includes adding the new links and priorities to the map data. Essentially, step 356 comprises the step of creating augmented map data 24.

Figure 9A:
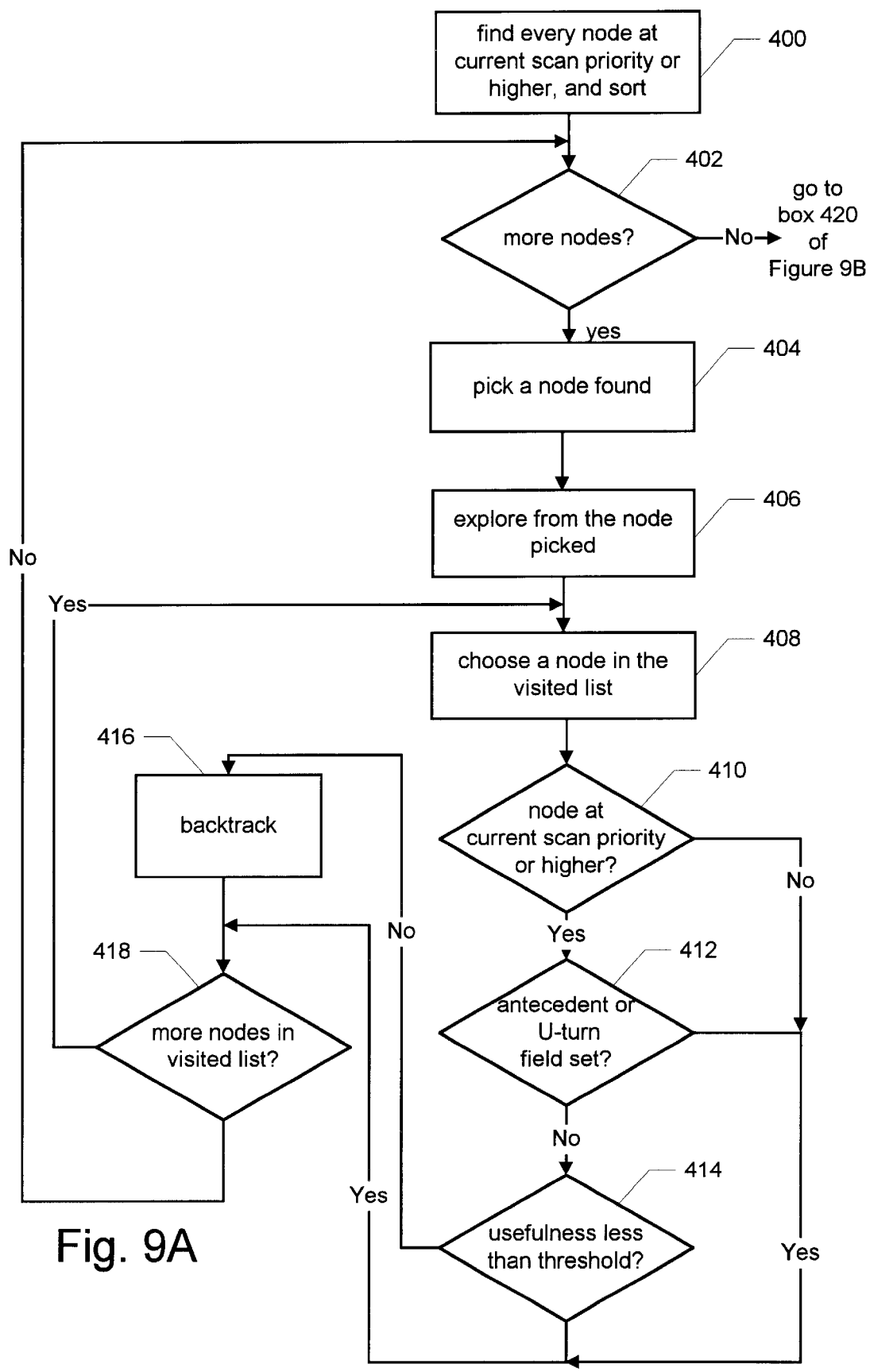
FIGS. 9A and 9B include a flow chart describing the method for performing step 350 (operate on current level) of FIG. 8.
Figure 9B:
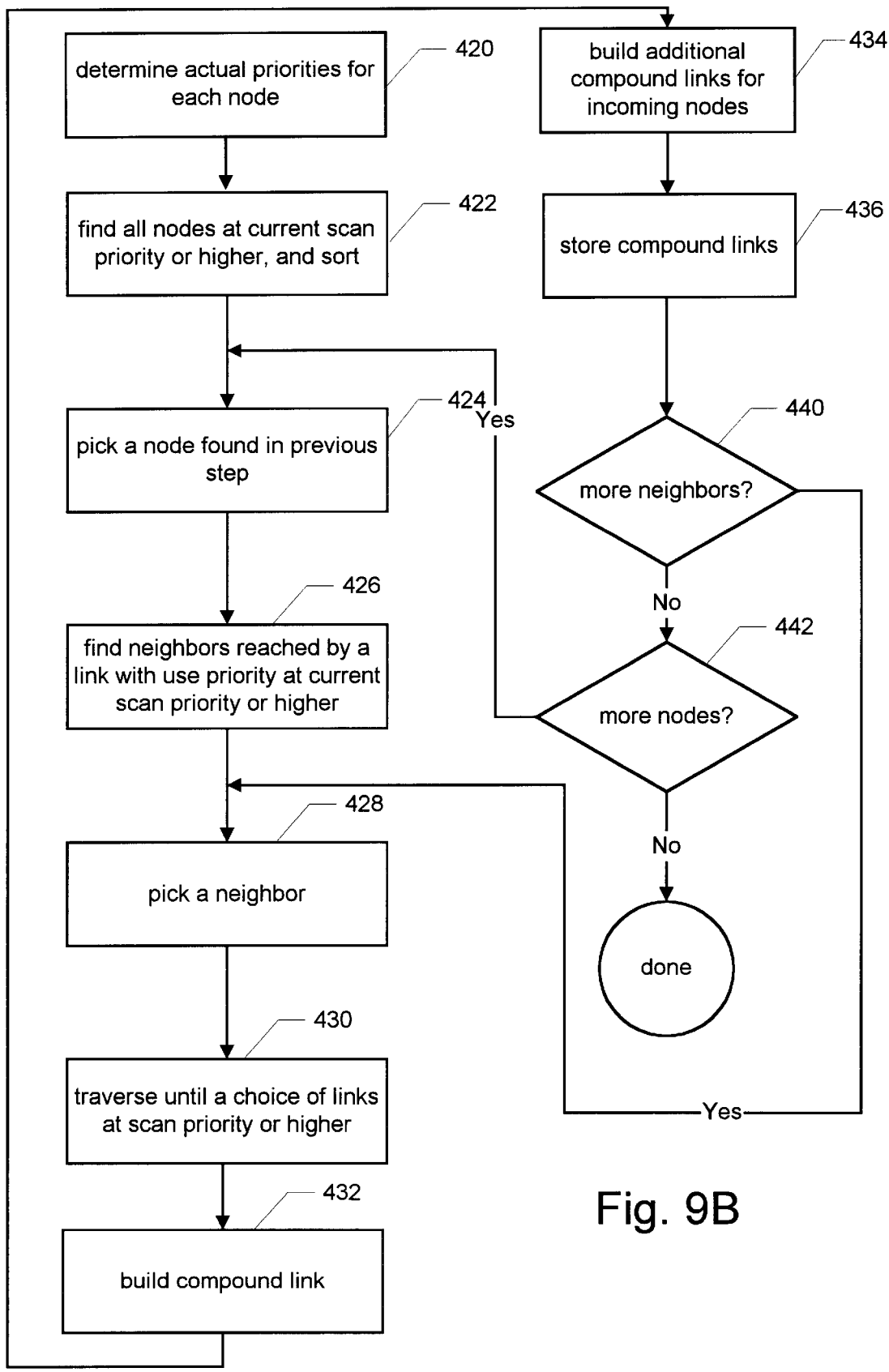

FIGS. 9A and 9B depict a flow chart which describes step 350 (operate on current level) of FIG. 8. That is, the method of FIGS. 9A and 9B are performed for each scan level. Thus, if there are five scan levels, then the method of FIGS. 9A–9B is performed five times. Note that FIGS. 9A–9B include steps 400–442. The method of FIGS. 9A–9B is not performed for scan level zero. For scan levels two through five, the method is commenced at step 400. For scan level one, the method commences at step 422.

Step 400 includes finding every node in the electronic map database that is at the current scan priority or higher and sorting those nodes. The nodes are sorted to form a K-D tree. This sort creates a linear list of nodes such that the nodes that are close geographically will usually be close in the list. Each link and node in the map database has an attribute called a use priority. The use priority indicates at what priority the link is useful. At the start of the process of FIG. 8, the use priority for each link is the priority of the road associated with the link. One exception is that U-turns typically have an initial use priority of 0. Additionally, the initial use priority of a node has the same as the road associated with the node. In step 402, short cut generator 22 determines whether there are any more nodes to process. If there are no more nodes to process, the method loops to step 420 (which is on FIG. 9B). If there are more nodes to process, the method loops to step 404. The first time step 402 is performed after step 400 it is expected that there are many nodes to process; therefore, short cut generator 22 is likely to proceed to step 404.

In step 404, short cut generator 22 picks one of the nodes found in step 400. In step 406, short cut generator 22 explores outward from the node picked in step 404. The step of exploring in step 406 is a modified version of the pathfinding process of FIG. 7. Some exceptions include that the exploration can only traverse along links with a use priority equal to the current scan priority, above the current scan priority or one less than the current scan priority.

FIG. 10 is a flow chart which explains the method for implementing step 406 (explore from the node picked) of FIG. 9A. The process of FIG. 10 does not find a path from the origin to a destination. Rather, the process of FIG. 10 explores outward from an origin. In step 500, the process is initialized. That is, the origin priority queue and origin visited list are set up. In the process of FIG. 10, the visited list and priority queue also include three additional fields: a Usefulness field, a U-turn field and an antecedent field. If the U-turn field is set (e.g. storing a logic 1), then the path including the node associated with U-turn field includes a U-turn. If the U-turn field for a particular node is not set, then the path that includes that node does not include a U-turn.

The antecedent field is used to signal whether the best path to the specific node is from the origin node or from an antecedent node. When the antecedent field is equal to zero, the best path to that particular node is from the origin node. When the antecedent field is equal to one (e.g. the antecedent field is set), the best path to the particular node is from the antecedent node. An antecedent node is a node that meets three criteria. The first criteria is that there is a link indicating a path from the antecedent node to the origin node. The second criteria is that there is also a link from the antecedent node to a node other than the origin node. The third criteria is that the link to the origin node (first criteria) and the link to the other node (second criteria) must have a use priority equal to the current scan priority, one less than the current scan priority or greater than the current scan priority. Step 500 includes placing all of the antecedent nodes into the priority queue and visited list with the antecedent field set. The origin does not have the antecedent field set.

In step 502, the usefulness field for each node is initially set to infinity (or some other large number). After completing step 502, the process of FIG. 10 proceeds to step 504 to determine whether there is another appropriate adjacent node. Step 504 is similar to step 306 except that appropriate adjacent nodes only include those adjacent nodes that can be traversed by a link with a use priority equal to the current scan priority, one below the current scan priority or a priority above the current scan priority. If there is another appropriate adjacent node, the process continues to step 506 at which point one of the appropriate adjacent nodes are picked and it is determined whether that picked appropriate adjacent node is in the visited list. If it is in the visited list, the method proceeds to step 510 and determines whether the node has a higher cost in the visited list. If it does have a higher cost, then the method proceeds to step 512 and edits the visited list to add the new cost and the new previous node to the visited list, the priority queue is edited accordingly, and the U-turn field is updated, if necessary. That is, if travel to the current node under consideration requires a U-turn, then the U-turn field must be set to indicate a U-turn. The use of the U-turn field represents an improvement over the prior art systems. In step 512, if the previous node (in the visited list) has its antecedent field set to one, then the antecedent field for the current node under consideration is set to one. After step 512, the process proceeds to step 514. If instep 510 it is determined that there is not a higher cost in the visited list, then the process continues to step 514. In step 514, short cut generator 22 checks the usefulness for the current adjacent node under consideration. After step 514, the process loops back to step 504. If in step 506 it is determined that the adjacent node under consideration was not in the visited list, then the method proceeds to step 508 which is similar in function to step 512 and includes editing the visited list, editing the priority queue, updating the U-turn field if necessary and updating the antecedent field if necessary. After step 508, the method loops back to step 504.

In addition to determining whether the adjacent nodes can be traveled to by a link at the appropriate priority, step 504 also determines whether a node is within a threshold cost of the origin. The origin for the current exploration is the node most recently picked in step 504 of FIG. 9A. Thus, short cut generator 22 determines a cost of traveling from the origin to the current node being considered as an appropriate adjacent node and determines whether this cost is less than the threshold. The threshold varies by level. Table 4 below provides examples of thresholds for scan levels 2–5.

TABLE 4

| Priority Level | Stopping Threshold |
| --- | --- |
| 2 | 300 seconds |
| 3 | 900 seconds |
| 4 | 1/2 hour |
| 5 | 1 hour |

If a current node being considered as an adjacent node is not within the threshold, then the adjacent node is not an appropriate adjacent node. Thus, the test in step 504 is whether the node is an adjacent node, can be reached by a link of the proper priority and is within the threshold.

If there are no more appropriate adjacent nodes in step 504, the system proceeds to step 520, which includes removing the head node from the priority queue. In step 522, short cut generator 22 determines whether the priority queue is empty. If the priority queue is empty, the method of FIG. 10 is complete. If the priority queue is not empty, the method of FIG. 10 loops back to step 504 to continue.

Figure 11:
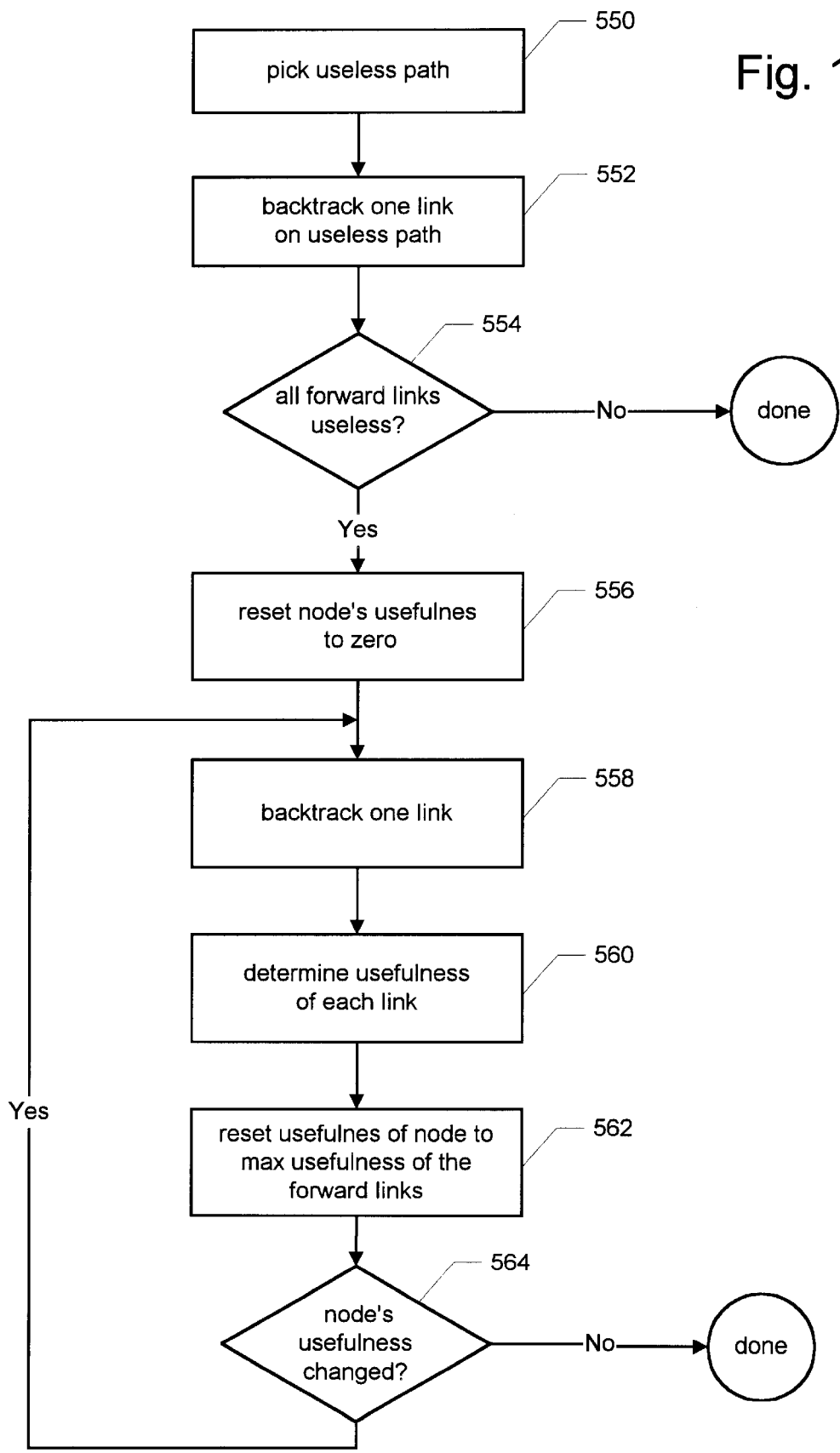
FIG. 11 is a flow chart describing the method for performing step 514 (check usefulness) of FIG. 10.

FIG. 11 is a flow chart which describes the method for implementing step 514 (check usefulness) of FIG. 10. The method of FIG. 11 is performed when, during the exploration of FIG. 10, a node under consideration is already in the visited list. In step 550, short cut generator 22 determines which of the two paths to the node under consideration is the useless path. That is, because the node is already in the visited list, there are two paths for getting to that node. The first path includes the path indicated by the visited list (prior to step 512). The second path includes the path for getting to the current adjacent node under consideration via the current head node on the priority queue. The path with the greater cost is considered the useless path.

In step 552, short cut generator 22 backtracks one link along the useless path to the node immediately proceeding the current adjacent node under consideration. In step 554, short cut generator 22 considers all the forward links leaving the node found in step 552. A forward link is a link that leaves the node. A forward link from the node found in step 552 would be considered useless if it leads to a node that is already in the visited list with lower costs and with the previous node being a node other than the node found in step 552. If at least one of the forward links from the node under consideration is not useless, then the process of FIG. 11 is completed. If all the forward links are useless, then short cut generator 22 proceeds to step 556 and resets to zero the usefulness of the node found in step 552. In step 558, short cut generator 22 backtracks one link from the node whose usefulness was just reset to zero. In step 560, short cut generator 22 determines the usefulness of each forward link leaving that node backtracked to in step 558. The usefulness of a link is the sum of the link's cost and the link's target node's usefulness. The usefulness field of that node reached in step 558 is changed to the maximum usefulness of its forward links. Thus, if any of the links that can be traveled on have a usefulness of infinity, then the nodes's usefulness will most likely remain at infinity. If the node backtracked to in step 558 has its usefulness changed in step 562, then the system loops back to in step 558 and repeats steps 558–564. One motive for these steps is that if a node only leads to useless nodes, then that node is also useless. If the node's usefulness was not changed in step 562, then the process of FIG. 11 is completed. In general, prior art short cut generators created short cuts or compound links that were not useful because they led to places that can be traveled to in a faster manner by another path. Thus, the steps of FIG. 11 provide a significant improvement over the prior art by creating more efficient and move useful short cuts.

After completing step 406 of FIG. 9A, short cut generator 22 has stored a visited list. In step 408, one node in the visited list is chosen. In step 410, it is determined whether the node is at the current scan priority or higher. If not, the method loops to step 418. If the node is at the current scan priority or higher, then in step 412 the system determines whether the antecedent field or U-turn field is set for the node under consideration. If either the antecedent or U-turn field is set, the method loops to step 418. If neither the antecedent nor U-turn field is set, the system loops to step 414 and determines whether the usefulness is less than a threshold. If the usefulness is less than the threshold, then the method of FIG. 9A loops to step 418. If the usefulness is not less than a threshold, then the system performs the step of backtracking (step 416). After backtracking, the system determines whether there are more nodes left in the visited list (step 418). If there are more nodes left, the system loops back to step 408 and chooses another node in the visited list. If there are no more nodes in the visited list, the system loops back to step 402 to determine whether there are more nodes to consider from the set of nodes identified in step 400. One example of a suitable threshold for step 414 is the promotion threshold (see Table 2) for the current scan level. Step 414 prevents the creation of a new link priority for a link terminating at a node that is not useful for the most recent iteration of step 406.

Figure 12:
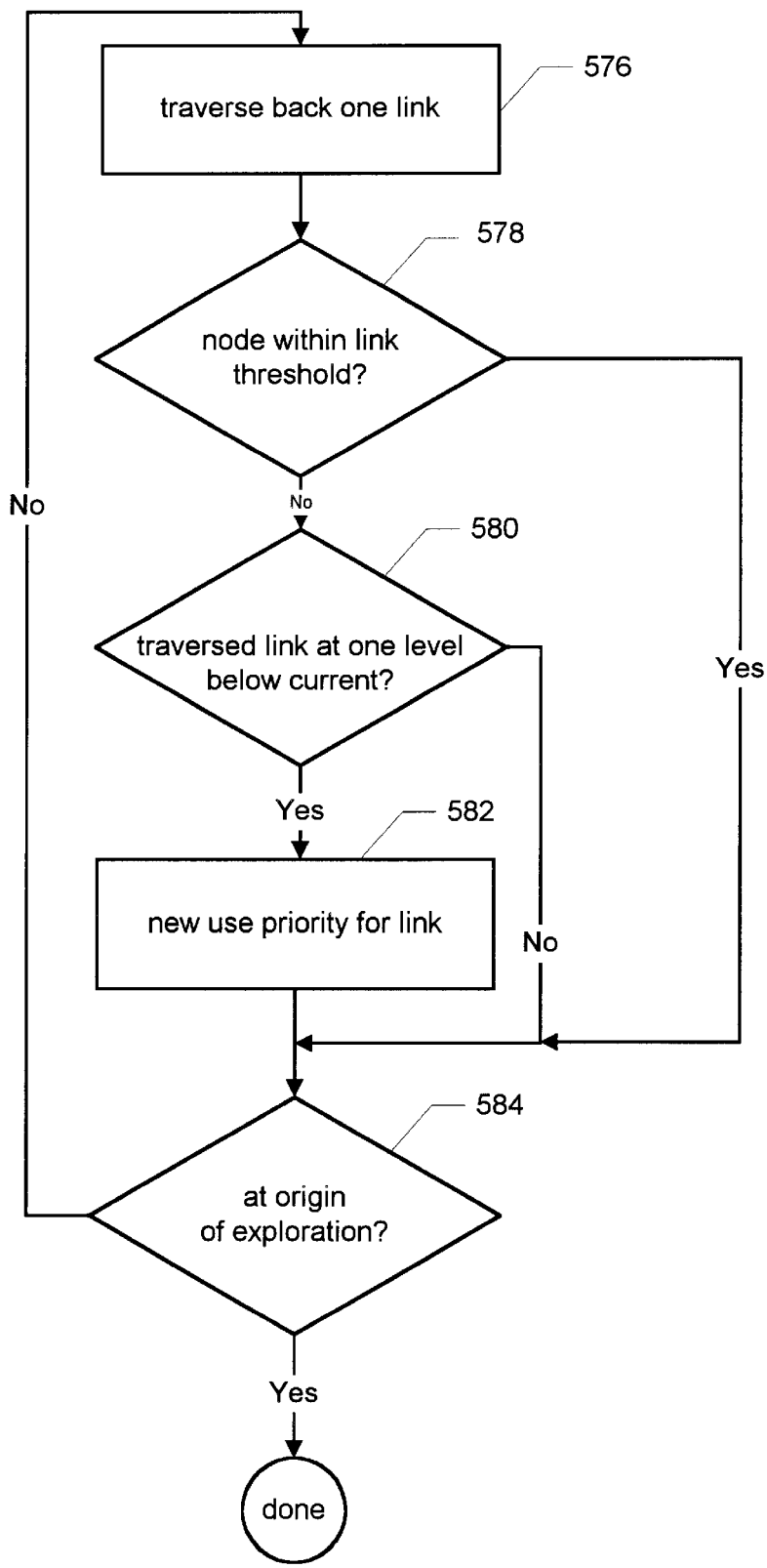
FIG. 12 is a flow chart describing the method for performing step 416 (back track) of FIG. 9A.

FIG. 12 is a flow chart that explains the process of step 416 (backtrack) of FIG. 9A. The process of FIG. 12 starts by considering the node under consideration in steps 408–414. In step 576, short cut generator 22 traverses back one link from the current node under consideration. That is, there is a previous field in the visited list which indicates the previous node along the path to get to the node under consideration. Step 576 includes traversing back to that previous node. In step 578, the system will test whether the link traversed to get to the previous node is within a link threshold of the origin or destination. If it is within the link threshold of the origin or destination, then the method of FIG. 12 loops to step 584. If the link is not within the link threshold of the origin or destination, the method proceeds to step 580. An example of the link threshold can be ten percent of the stopping threshold for the current scan priority.

In step 580, short cut generator 22 tests whether the link traversed to get to the previous node has a priority level equal to one level below the current scan priority. If so, a new priority value is generated for that link to replace the old priority value. After step 582, the system determines whether the node traversed to in step 576 is the origin of the most recent exploration. If it is not, the method of FIG. 12 loops back to step 576. If it is the origin, the method of FIG. 12 is completed. If in step 580 the traversed link is not at a priority level equal to one level below the current scan priority, then the method loops to step 584. The method of FIG. 12 can be thought of as a process for promoting certain links.

Figure 13A:
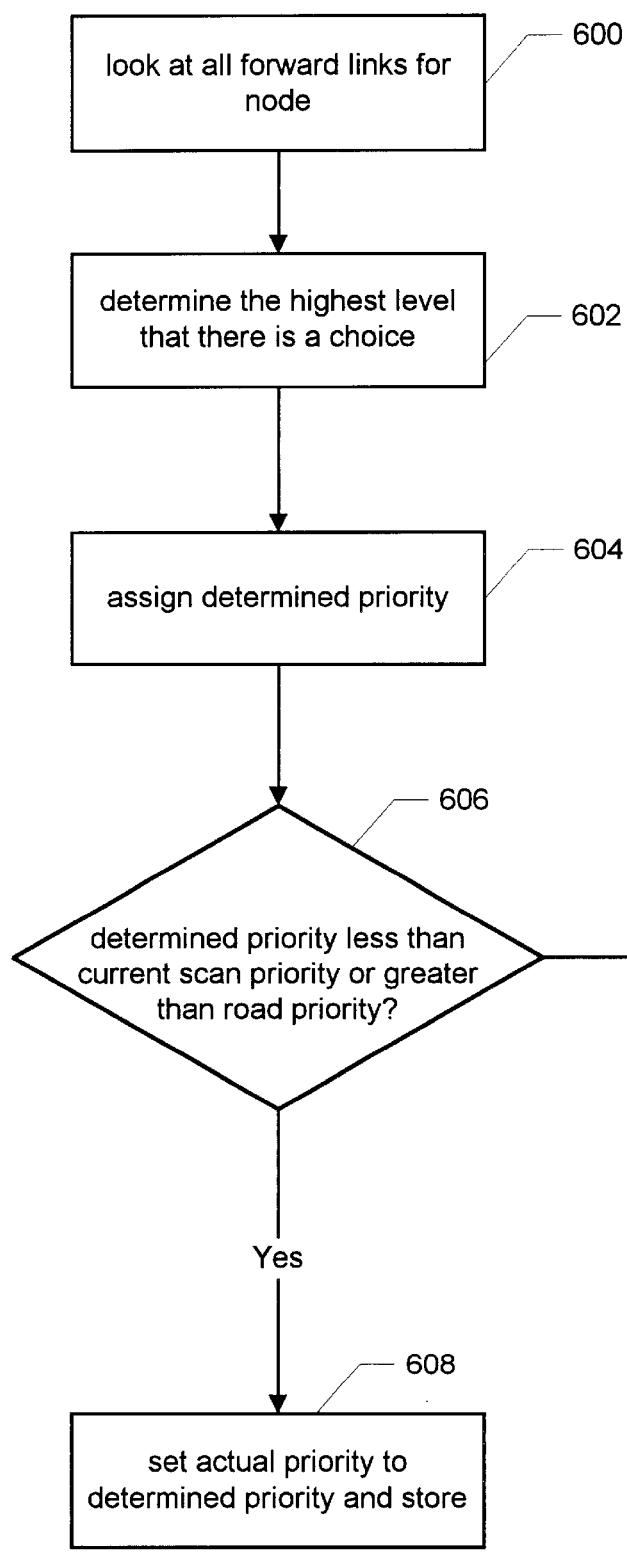
FIG. 13A is a flow chart describing the method for performing step 420 (determine actual priorities for each node picked) of FIG. 9B.

Looking back at FIG. 9A, if it is determined in step 402 that all nodes that were identified in step 400 have been considered, the process of FIGS. 9A–9B proceeds to step 420. In step 420, short cut generator 22 determines priorities for each node picked in step 400. FIG. 13A is a flow chart which depicts the process of determining the priorities for each node picked (step 420). The process of FIG. 13A is performed for each node identified in step 400.

Figure 13B:
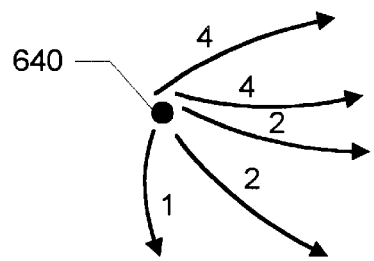
FIG. 13B depicts a node with four forward links, used to help explain FIG. 13A.
Figure 13C:
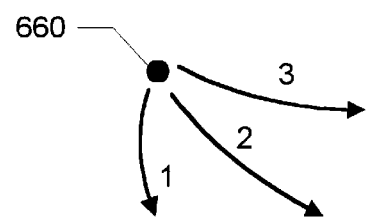
FIG. 13C depicts a node with three forward links, used to help explain FIG. 13A.

In step 600, short cut generator 22 looks at all forward links for the current node under consideration. FIG. 13B shows node 640 with five forward links. FIG. 13C shows node 660 with three forward links. The numbers next to each forward link represents the priority for each link. In step 602, short cut generator 22 determines the highest priority for which there is a choice of forward links. For purposes of step 602, a link at a given priority level can also be considered to be any of the priority levels below the given priority level. For example, looking at FIG. 13B, the top forward link has a priority level of four. That link can also be considered at level three, level two or level one. Looking at FIG. 13B, there is a choice of two forward links at level four, there is a choice of two forward links at level three, there is a choice of four forward links at level two and there is a choice of five forward links at level one. The highest level that there is a choice of forward links is at level four.

Looking at FIG. 13C, there are forward links at levels one, two and three. Thus, there is a choice of three links at level one and two links at level two. There is only one link at level three. Therefore, the highest level that there is a choice of forward links is at level two.

In step 604, the node under consideration is assigned a "determined priority" equal to the highest level of choice determined in step 602. In step 606, the "determined priority" assigned in step 604 is compared to the current scan priority and the priority of the road associated with the node. If the determined priority assigned in step 604 is less than the current scan priority, or the determined priority is greater than the priority of the road associated with the node, then the process proceeds to step 608; otherwise, the process proceeds to step 610. In step 608, the actual priority for the node is set to the determined priority assigned in step 604. This actual priority is stored in a temporary file in a processor readable storage medium. In step 610, the actual priority of the node, initially set to be equal to the priority of the road associated with the node, is not changed. This actual priority is also stored in the processor readable storage medium.

After completing step 420 of FIG. 9B, short cut generator 22 performs step 422 which includes finding all nodes at the current scan priority or higher and again sorting those nodes similar to the sort performed in step 400. In step 424, short cut generator 22 picks one of the nodes identified in step 422. In step 426, short cut generator 22 finds all of the neighbors of the node picked in step 424 that can be reached by a link with the use priority at the current scan priority or higher. In step 428, one of those neighbors are chosen. In step 430, short cut generator 22 traverses on a forward link from that neighbor and continues to traverse on forward links until there is a choice of links at the current scan priority or higher. Once a choice is reached, a compound link is created in step 432. The compound link starts at the node picked in step 424 and ends where there is the choice of links (see step 430).

In step 434, the system creates additional compound links for "incoming nodes." Short cut generator 22 looks at all nodes that represent travel into an intersection that is the start of a compound link built in step 432. The node entering the intersection is labeled an "incoming node." A link is added from the incoming node to the node at the end of the compound link built in step 432. This added link is the additional compound link created in step 434. If the incoming node is at priority zero, then backtrack one link to start the new compound link of step 434.

In step 436, the compound links created in steps 432 and 434 are stored in a processor readable storage medium. In one embodiment, the compound links in step 436 and the new priorities in step 608 are stored in temporary files, and permanently (or semi-permanently) stored in the augmented map data 24 in step 356. In another embodiment, the process of the current invention does not include step 356 and the steps 436 and 608 include the process of storing the new links and priorities into the augmented map data 24.

After step 436 of FIG. 9B, short cut generator 22 determines whether there are more neighbors (see step 426) to consider. If there are more neighbors to consider, the process loops to step 428. If there are no more neighbors to consider, the process loops to step 442 and determines whether there are more nodes (of the nodes found in step 422) to consider. If there are no more nodes to consider, then the process of FIGS. 9A–9B is completed. If there are more nodes to consider, then the process loops back to step 424.

As can be seen, short cut generator 22 works on a level by level process. Short cut generator 22 finds all short cuts at level two that use level one roads. Then short cut generator 22 proceeds to level three and finds all short cuts at level three that use level two roads (including those previously promoted), and so on.

The short cut generator of the present invention may be implemented in hardware and/or software. In one implementation, the system may comprise a dedicated processor including processor instructions for performing the functions described herein. Circuits may also be developed to perform the functions described herein. In one embodiment, the present invention is part of a navigation system. Examples of navigation systems are described in U.S. Pat. No. 4,796,191, Vehicle Navigation System and Method; U.S. Pat. No. 4,914,605, Map Display Apparatus and Method; U.S. Pat. No. 5,311,195, Combined Relative and Absolute Positioning Method and Apparatus; and U.S. Pat. No. 5,948,043 dated Sep. 7, 1999, Navigation System Using GPS Data, all of which are incorporated herein by reference. In another implementation, the present invention includes a plurality of processor executable instructions for use with a computer system. Prior to loading into a computer system, the software may reside on a computer readable medium, such as a magnetic floppy disk, magnetic tape, and CD-ROM.

Figure 14:
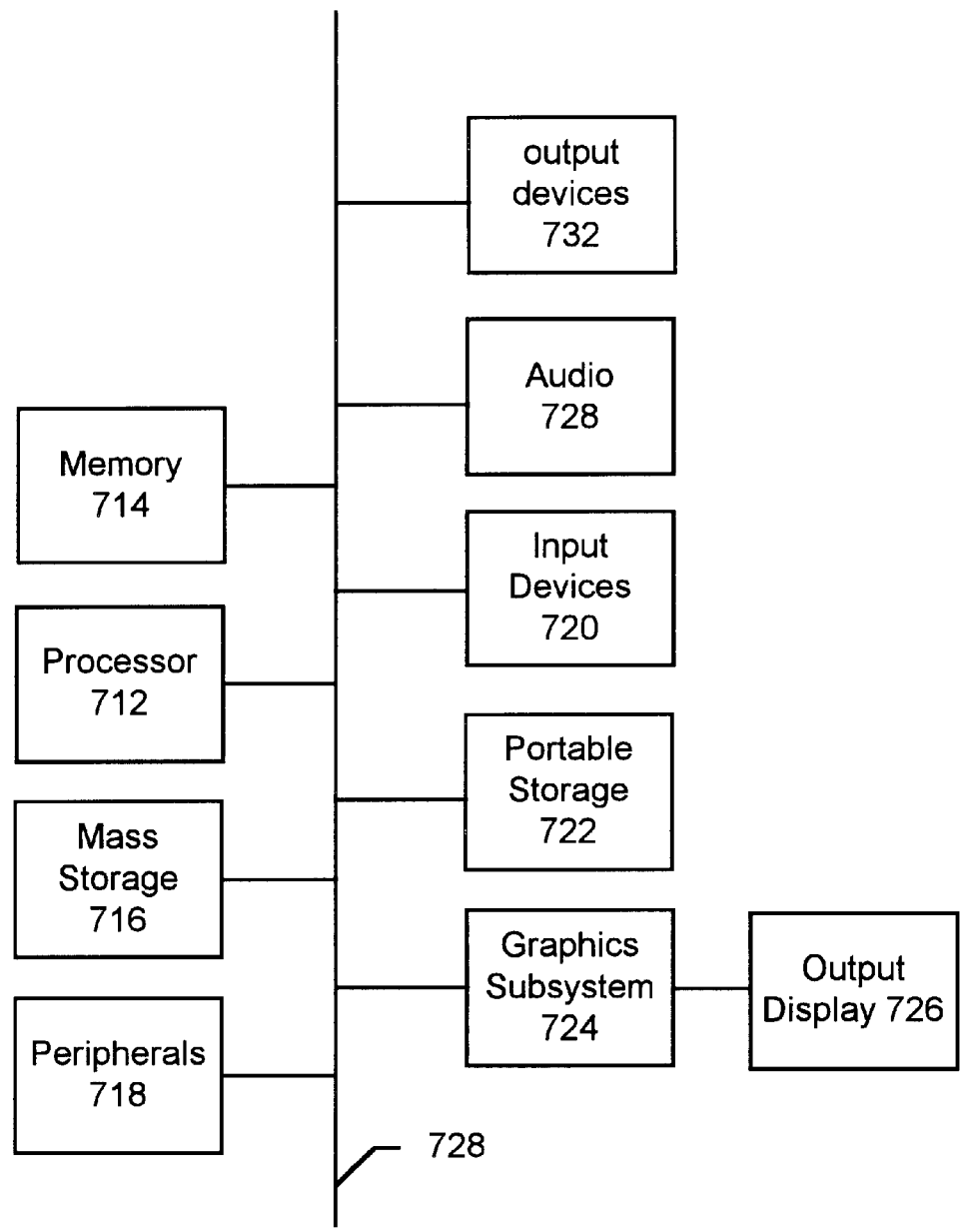
FIG. 14 is a block diagram of one exemplar hardware system for implementing a short cut generator and/or a pathfinding system.

FIG. 14 illustrates a high level block diagram of a computer system which can be used to implement the short cut generator and/or the pathfinding system. The computer system of FIG. 14 includes a processor unit 712 and main memory 714. Processor unit 712 may contain a single microprocessor, or may contain a plurality of microprocessors for configuring the computer system as a multi-processor system. Main memory 714 stores, in part, instructions and data for execution by processor unit 712. If the system of the present invention is wholly or partially implemented in software, main memory 714 stores the executable code when in operation. Main memory 714 may include banks of dynamic random access memory (DRAM) as well as high speed cache memory.

The system of FIG. 14 further includes a mass storage device 716, peripheral device(s) 718, input device(s) 720, portable storage medium drive(s) 722, a graphics subsystem 724 and an output display 726. For purposes of simplicity, the components shown in FIG. 14 are depicted as being connected via a single bus 728. However, the components may be connected through one or more data transport means. For example, processor unit 712 and main memory 714 may be connected via a local microprocessor bus, and the mass storage device 716, peripheral device(s) 718, portable storage medium drive(s) 722, and graphics subsystem 724 may be connected via one or more input/output (I/O) buses. Mass storage device 716, which may be implemented with a magnetic disk drive or an optical disk drive, is a non-volatile storage device for storing data and instructions for use by processor unit 712. In one embodiment, mass storage device 16 stores the system software for implementing the present invention for purposes of loading to main memory 714.

Portable storage medium drive 722 operates in conjunction with a portable non-volatile storage medium, such as a floppy disk, to input and output data and code to and from the computer system of FIG. 14. In one embodiment, the system software for implementing the present invention is stored on such a portable medium, and is input to the computer system via the portable storage medium drive 722. Peripheral device(s) 718 may include any type of computer support device, such as an input/output (I/O) interface, to add additional functionality to the computer system. For example, peripheral device(s) 18 may include a network interface card for interfacing computer system to a network, a modem, etc.

Input device(s) 720 provide a portion of a user interface. Input device(s) 720 may include an alpha-numeric keypad for inputting alpha-numeric and other key information, or a pointing device, such as a mouse, a trackball, stylus, or cursor direction keys. In order to display textual and graphical information, the computer system of FIG. 14 includes graphics subsystem 724 and output display 726. Output display 726 may include a cathode ray tube (CRT) display, liquid crystal display (LCD) or other suitable display device. Graphics subsystem 724 receives textual and graphical information, and processes the information for output to display 726. Output display 726 can be used to report the results of a pathfinding determination, display a map, display directions, display confirming information and/or display other information that is part of a user interface. The system of FIG. 14 also includes an audio system 728, which includes a microphone. In one embodiment, audio system 728 includes a sound card that receives audio signals from the microphone. Additionally, the system of FIG. 14 includes output devices 732. Examples of suitable output devices include speakers, printers, etc.

The components contained in the computer system of FIG. 14 are those typically found in general purpose computer systems, and are intended to represent a broad category of such computer components that are well known in the art. Thus, the computer system of FIG. 14 can be a personal computer, workstation, minicomputer, mainframe computer, etc. The computer can also include different bus configurations, networked platforms, multi-processor platforms, etc. Various operating systems can be used including Unix, Linux, Windows, MacIntosh OS, and other suitable operating systems.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for adding short cuts to an electronic map, comprising the steps of:

storing a set of nodes and links of said electronic map, said links being associated with link priorities;

exploring outward from said nodes using a processor, said step of exploring includes determining which nodes are not useful;

creating new link priorities for a set of said links that were traversed during said exploring and do not terminate at a node determined to be not useful;

building compound links, said compound links may include one or more links with said new link priorities; and storing said compound links in said electronic map, said compound links represent said short cuts.

2. A method according to claim 1, further comprising the steps of:

storing node priorities for said nodes in said electronic map;

creating new node priorities for a set of said nodes connected by one or more of said links having a new link priority; and storing said new node priorities in said electronic map.

3. A method according to claim 2, further comprising the step of:

storing one or more u-turn indications for paths traversed during said exploring that include a u-turn, said step of creating new link priorities does not consider links on paths associated with said stored u-turn indications.

4. A method according to claim 2, further comprising the step of:

receiving an original map file, said original map file includes said nodes in said electronic map; said steps of storing said new node priorities and storing said compound links include generating a new file; and said new file includes said new node priorities, said compound links and said nodes in said electronic map from said original map file.

5. A method according to claim 2, wherein:

said step of building compound links includes traversing along successive links until a choice of links of at least a scan priority and building a new link representing travel along said traversed successive links.

6. A method according to claim 2, wherein said step of exploring outward includes the steps of:

setting usefulness for a set of nodes to infinity prior to exploring;

checking a particular node's usefulness when traversing to said particular node while exploring;

changing said particular node's usefulness if said particular node is not useful;

checking usefulness for one or more nodes behind said particular node if said particular node is not useful; and changing said usefulness for appropriate ones of said one or more nodes behind said particular node if said appropriate ones of said one or more nodes behind said particular node are not useful.

7. A method according to claim 2, wherein said step of creating new link priorities includes the steps of:

identifying a first group of nodes, said first group of nodes were visited during said step of exploring and are at a current scan level or higher;

backtracking along paths to said first group of nodes;

changing priorities to a current scan priority for links along said paths to said first group of nodes that have a priority equal to one level below said current scan priority.

8. A method according to claim 2, wherein said step of creating new node priorities includes the steps of:

examining forward links for a node under consideration;

determining a highest priority level that there is a choice, based on said step of examining; and setting said new node priority to said determined highest priority if said determined highest priority is less than a current scan priority.

9. A method according to claim 8, wherein:

said steps of examining forward links, determining a highest priority level and setting said new node priority to are performed for each node at a current scan level.

10. A method according to claim 2, wherein:
said steps of exploring outward, creating new link priorities, creating new node priorities and building compound links are performed at each of a plurality of scan levels.

11. A method according to claim 10, further including the step of:
identifying every node at a current scan level prior to said step of exploring being performed at said current scan level, said step of exploring is performed on each node identified in said step of identifying.

12. A processor readable storage medium storing an electronic map, said electronic map having short cuts added to said electronic map according to the method of claim 2.

13. An apparatus including a processor readable storage medium storing an electronic map, said electronic map having short cuts added to said electronic map according to the method of claim 2.

14. A processor readable storage medium storing an electronic map, said electronic map having short cuts added to said electronic map according to the method of claim 1.

15. An apparatus including a processor readable storage medium storing an electronic map, said electronic map having short cuts added to said electronic map according to the method of claim 1.

16. A method for adding short cuts to an electronic map, comprising the steps of:
assigning node priorities for nodes in said electronic map, said nodes being connected by links, said links having link priorities;
exploring outward from said nodes using a processor;
storing one or more u-turn indications for paths traversed during said exploring that include a u-turn;
creating new link priorities for a set of said links on paths that were traversed during said exploring, said step of creating new link priorities does not consider paths associated with said stored u-turn indications;
creating new node priorities for a set of said nodes connected by one or more of said links having a new link priority;
building compound links;
storing said new node priorities in said electronic map; and
storing said compound links in said electronic map, said compound links represent said short cuts.

17. A method for enhancing the use of an electronic map by adding the use of short cuts, comprising the steps of:
storing nodes and links of said electronic map, said links having link priorities;
exploring outward from said nodes using a processor, said step of exploring includes determining which nodes are not useful;
creating new link priorities for a set of said links that were traversed during said exploring and do not terminate at a node determined to be not useful;
building compound links, said compound links may include one or more links with said new link priorities;
storing said compound links in said electronic map, said compound links represent said short cuts;
storing a designation of an origin in said electronic map;
storing a designation of a destination in said electronic map;
determining a path from said origin to said destination, said path including at least one of said compound links; and
reporting said path.

18. A method according to claim 17, further comprising the steps of:
storing node priorities for said nodes in said electronic map;
creating new node priorities for a set of said nodes connected by one or more of said links having a new link priority; and
storing said new node priorities in said electronic map.

19. A method according to claim 17, further comprising the step of:
storing one or more u-turn indications for paths traversed during said exploring that include a u-turn, said step of creating new link priorities does not consider links on paths associated with said stored u-turn indications.

20. A processor readable storage medium having processor readable code embodied on said processor readable storage medium, said processor readable code for programming a processor to perform a method comprising the steps of:
storing a set of nodes and links of an electronic map, said links being associated with link priorities;
exploring outward from said nodes using a processor, said step of exploring includes determining which nodes are not useful;
creating new link priorities for a set of said links that were traversed during said exploring and do not terminate at a node determined to be not useful;
building compound links, said compound links may include one or more links with said new link priorities; and
storing said compound links in said electronic map, said compound links represent said short cuts.

21. A processor readable storage medium according to claim 20, said method further comprising the steps of:
storing node priorities for said nodes in said electronic map;
creating new node priorities for a set of said nodes connected by one or more of said links having a new link priority; and
storing said new node priorities in said electronic map.

22. A processor readable storage medium according to claim 21, wherein said method further comprising the steps of:
storing one or more u-turn indications for paths traversed during said exploring that include a u-turn, said step of creating new link priorities does not consider links on paths associated with said stored u-turn indications.

23. A processor readable storage medium according to claim 21, wherein said step of exploring outward includes the steps of:
setting usefulness for a set of nodes to infinity prior to exploring;
checking a particular node's usefulness when traversing to said particular node while exploring;
changing said particular node's usefulness if said particular node is not useful;
checking usefulness for one or more nodes behind said particular node if said particular node is not useful; and
changing said usefulness for appropriate ones of said one or more nodes behind said particular node if said appropriate ones of said one or more nodes behind said particular node are not useful.

24. A processor readable storage medium according to claim 21, wherein:
said steps of examining forward links, determining a highest priority level and setting said new node priority to are performed for each node at a current scan level.

25. An apparatus, comprising:

an input device;

a processor readable storage medium; and a processor in communication with said input device and said processor readable storage medium, said processor readable storage medium storing code to program aid processor to perform the method comprising the steps of:

storing a set of nodes and links of an electronic map, said links being associated with link priorities, exploring outward from said nodes using a processor, said step of exploring includes determining which nodes are not useful, creating new link priorities for a set of said links that were traversed during said exploring and do not terminate at a node determined to be not useful, building compound links, said compound links may include one or more links with said new link priorities, and storing said compound links in said electronic map, said compound links represent said short cuts.

26. An apparatus according to claim 25, wherein said method further comprising the steps of:

storing one or more u-turn indications for paths traversed during said exploring that include a u-turn, said step of creating new link priorities does not consider links on paths associated with said stored u-turn indications.

27. An apparatus according to claim 25, wherein said method further comprising the steps of:

storing a designation of an origin in said electronic map;

storing a designation of a destination in said electronic map;

determining a path from said origin to said destination, said path including at least one of said compound links; and reporting said path.

28. An apparatus according to claim 25, wherein said method further comprising the steps of:

storing node priorities for said nodes in said electronic map;

creating new node priorities for a set of said nodes connected by one or more of said links having a new link priority; and storing said new node priorities in said electronic map.

29. An apparatus according to claim 28, wherein said step of exploring outward includes the steps of:

setting usefulness for a set of nodes to infinity prior to exploring;

checking a particular node's usefulness when traversing to said particular node while exploring;

changing said particular node's usefulness if said particular node is not useful;

checking usefulness for one or more nodes behind said particular node if said particular node is not useful; and changing said usefulness for appropriate ones of said one or more nodes behind said particular node if said appropriate ones of said one or more nodes behind said particular node are not useful.

30. An apparatus according to claim 28, wherein:

said steps of examining forward links, determining a highest priority level and setting said new node priority to are performed for each node at a current scan level.

* * * * *